UNITED STATES PATENT OFFICE.

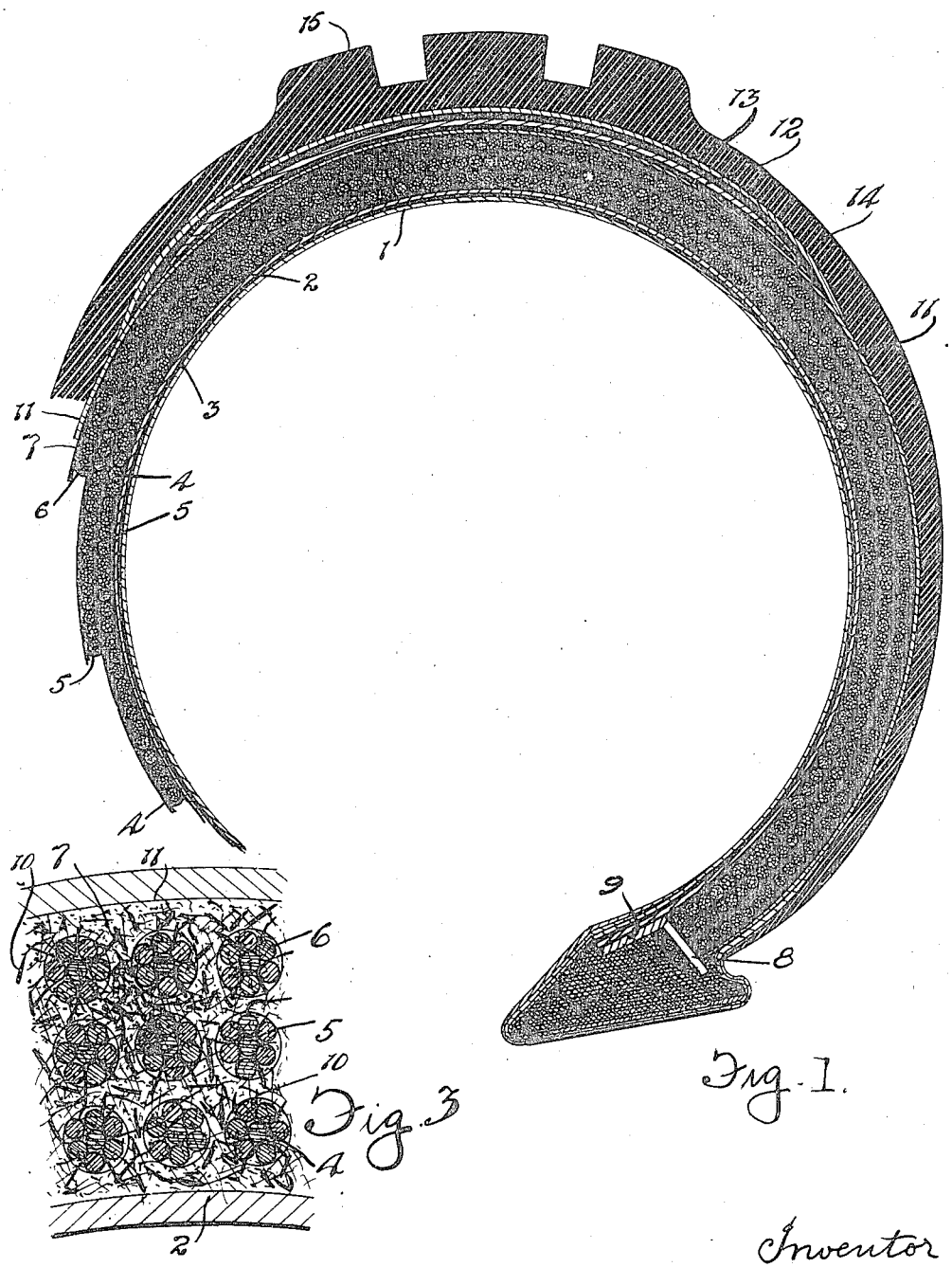

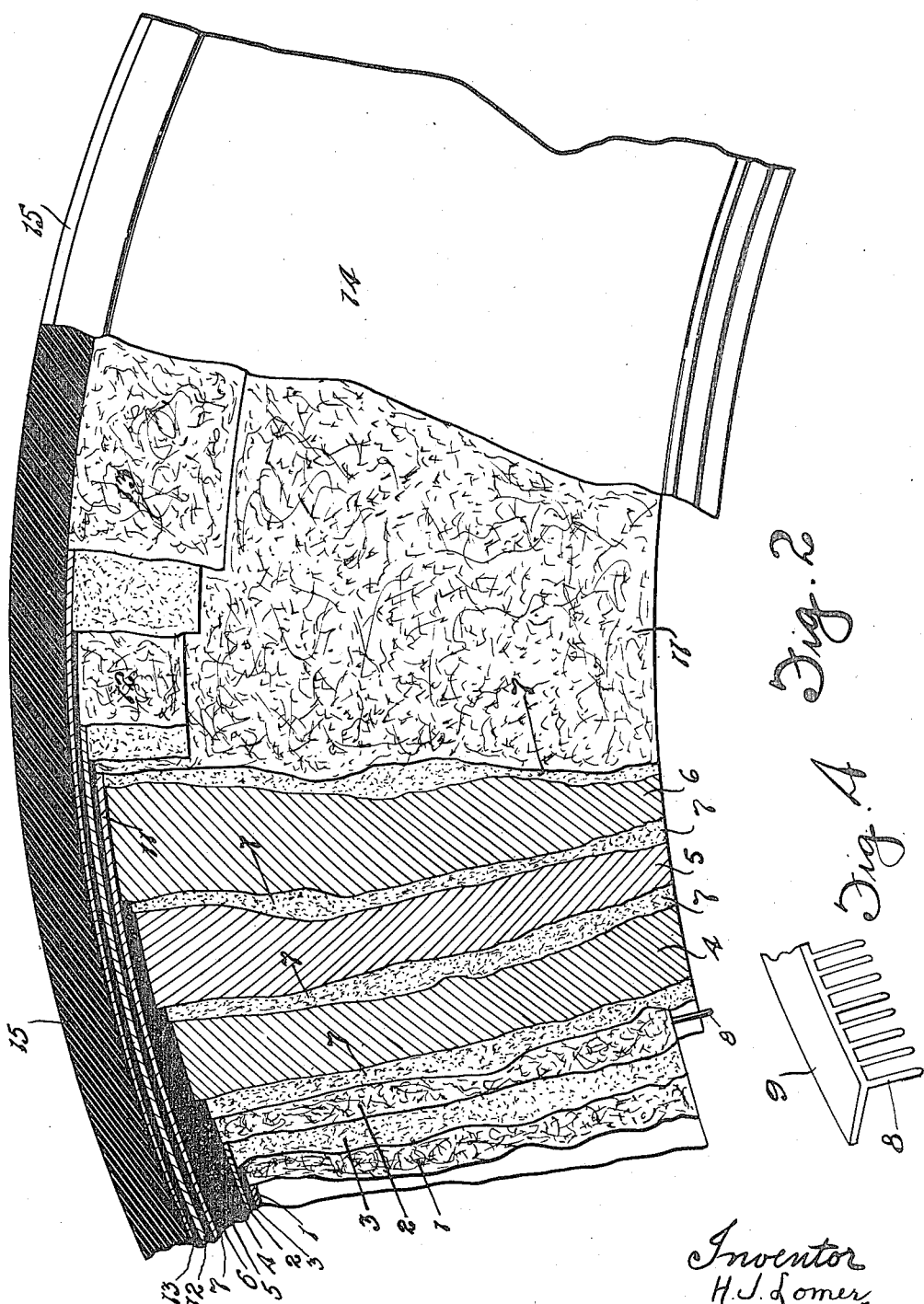

HENRY JOHN LOMER, OF DETROIT, MICHIGAN.

TIRE.

1,277,438.

Specification of Letters Patent.   Patented Sept. 3, 1918.

Application filed August 6, 1917.   Serial No. 184,754.

*To all whom it may concern:*

Be it known that I, HENRY JOHN LOMER, of the city of Detroit, in the State of Michigan, United States of America, have invented certain new and useful Improvements in Tires, of which the following is the specification.

The invention relates to improvements in tires, particularly automobile tires and the object of the invention is to provide an improved tire construction which will render the tire less liable to "blow-outs" and punctures and which will generally increase the life of the tire.

With the above object in view the invention consists essentially in the arrangement and construction of parts hereinafter more particularly described and later pointed out in the appended claim, reference being had to the accompanying drawings in which:—

Figure 1 represents a transverse sectional view through a portion of the tire embodying my invention.

Fig. 2 represents a fragmentary view of a portion of the tire with successive layers torn away to expose construction.

Fig. 3 represents an enlarged detailed sectional view through a part of the tire showing the manner in which the bond is formed between the wire cables and the rubber in which the cables are set.

Fig. 4 represents a perspective view of a portion of the toothed ring.

In the drawings like characters of reference indicate corresponding parts in the several figures.

The tire is formed from a series of layers of fabric, rubber and strands of wire cable built up in the following way:—

1 represents an inner course or layer of fabric forming the interior wall of the tire and 2 represents a second reinforcing inner layer of fabric overlying the layer 1 to which it is made fast by an interposed rubber coating 3. Over the fabric 2 I apply three layers 4, 5 and 6 of wire cables set in rubber 7, the cables being each formed from a number of strands of wires. The successive layers of courses of cables are arranged so that they cross one another, that is to say, the inner layer 4 of cables and outer layer 6 of cables spiral from side to side of the tire in the same direction while the intermediate layer 5 of cables spiral from side to side of the tire in the opposite direction, this feature being best shown in Fig. 2 of the drawings. In speaking of the spiraling of the cables I wish it to be understood that this word is only used to indicate general direction as in the full meaning of the word the cables do not coil as in a spiral but only pass from side to side of the tire in a spiraling manner.

In laying the cables I might explain that they are alternately wound back and forth over the teeth 8 of side rings 9 embedded in the rim side of the tire.

In order to effect a positive bond between the rubber in which the cables are set and the cables I mix clipped hair indicated at 10 (Fig. 3) in the rubber, which hair in the vulcanizing process finds its way in between the strands of wire of the cables and has the effect of bonding the rubber to the cables. Over the cables as set in the rubber I apply an outer fabric 11 which envelops the tire and is covered at the tread side of the tire with two further fabric layers 12 and 13 set in rubber and inclosed as are the sides of the fabric 11 by the outer tire rubber coating 14 forming the exposed face of the tire and constructed to give a thick tread face as indicated at 15.

An outer tire constructed in accordance with the above disclosure will be practically puncture proof and there will be little possibility of "blow-outs" as it will be seen that the cables which really form the body of the tire are effectively bonded and further that the crossing of the three layers of cables presents a surface which is not readily punctured.

What I claim as my invention is:—

In an outer rubber tire, cross courses of wire cable passing from side to side of the tire and embedded in the rubber and a bonding material of hair mixed with the rubber to tie the rubber together around the wires and to maintain hugging of the wires by the rubber.

Signed at Regina, in the Province of Saskatchewan, this 20th day of June, 1917.

HENRY JOHN LOMER.

In the presence of—
 E. S. COLLETT,
 G. MARTIN.